US009632603B2

(12) United States Patent
Fang et al.

(10) Patent No.: US 9,632,603 B2
(45) Date of Patent: Apr. 25, 2017

(54) DISCRETE PASSWORD ENTRY USING KEYBOARD WITH CHARACTER AND POSITION CARRIERS

(71) Applicant: International Business Machines Corporation, Armonk, NY (US)

(72) Inventors: Wu Song Fang, Beijing (CN); Su Liu, Austin, TX (US); Jun Su, Beijing (CN); Cheng Xu, Beijing (CN); Quan Wen Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 14/832,870

(22) Filed: Aug. 21, 2015

(65) Prior Publication Data

US 2016/0063228 A1    Mar. 3, 2016

(30) Foreign Application Priority Data

Aug. 29, 2014    (CN) ............ 2014 1 0437396

(51) Int. Cl.
*G06F 21/00* (2013.01)
*G06F 3/0362* (2013.01)
*G06F 21/36* (2013.01)

(52) U.S. Cl.
CPC ............ *G06F 3/0362* (2013.01); *G06F 21/36* (2013.01); *G06F 2221/031* (2013.01)

(58) Field of Classification Search
CPC ...................................................... G06F 21/36
(Continued)

(56) References Cited

U.S. PATENT DOCUMENTS

2007/0089164 A1    4/2007    Gao et al.
2010/0073126 A1    3/2010    Morin et al.
(Continued)

FOREIGN PATENT DOCUMENTS

WO    WO2013153403 A1    10/2013

OTHER PUBLICATIONS

"Method of Specifying and Using Custom Symbols for Secure User Authentication to a Personal Computing Device," IP.com Prior Art Database Technical Disclosure No. IPCOM000176317D, Nov. 12, 2008, 2 pages.
(Continued)

*Primary Examiner* — Longbit Chai
(74) *Attorney, Agent, or Firm* — Yee & Associates, P.C.; Stephen R. Yoder (57) ABSTRACT

A method and apparatus for password entry, the method comprising: displaying a password inputting keyboard on a display, the keyboard including a character carrier and a position carrier, the character carrier and the position carrier are capable of relative movement between each other so that when the position of a character in the character carrier is corresponding to a position mark on the position carrier, the position of at least one other character in the character carrier is corresponding to at least one other position mark in the position carrier; in response to a user causing relative movement between the character carrier and the position carrier, aligning a character in the character carrier with a position mark in the position carrier; and in response to a lapse of a predetermined time, recording the character and its input order and changing the layout of the password inputting keyboard.

21 Claims, 8 Drawing Sheets

(58) Field of Classification Search
USPC .......................................................... 726/19
See application file for complete search history.

(56) References Cited

U.S. PATENT DOCUMENTS

2013/0291096 A1    10/2013  Finnan et al.
2014/0123274 A1*   5/2014   Chen ...................... G06F 21/46
                                                    726/18

OTHER PUBLICATIONS

"System and Method for Encoding Credit Card with Digit Substitution Rules," IP.com Prior Art Database Technical Disclosure No. IPCOM000236814D, May 16, 2014, 3 pages.

* cited by examiner

DISCRETE PASSWORD ENTRY USING KEYBOARD WITH CHARACTER AND POSITION CARRIERS

CROSS-REFERENCE TO RELATED APPLICATION(S)

This application claims the benefit of priority to Chinese Patent Application No. 201410437396.6, filed Aug. 29, 2014, the entire contents of which are incorporated herein by reference.

BACKGROUND

Various embodiments of the invention relate to the technology of user authentication, and more specifically, to the protection of user-input password information.

With the development of computer and communication networks, mobile smart devices, such as mobile phones, are commonly used. People can conduct information browsing and communications with mobile smart devices in public places, and can also use computers provided by service institutions (e.g. banks) for various transaction processing. In order to protect the privacy of users and data, the smart devices and the computers are usually configured with password entry functions requiring users to enter their password when logging in the system and applications.

There are various ways for password entry, including inputting password via a soft keyboard displayed on the touch screen of the mobile device. In public places such as the subway, when a user inputs password via the soft keyboard, the layout of the soft keyboard and the user's password entry operations are vulnerable to others' peeping, and the password entered via the soft keyboard by the user is easy to be guessed by peepers.

SUMMARY OF THE INVENTION

Therefore, one of the objectives of this invention is to provide an improved method and apparatus for password entry.

On the one hand, there is provided a method for password entry, comprising:

displaying a password inputting keyboard on a display screen, the password inputting keyboard including a character carrier and a position carrier, wherein the character carrier is provided with a plurality of characters, the position carrier is provided with a plurality of position marks, the character carrier and the position carrier are capable of relative movement between each other so that when the position of a character in the character carrier is corresponding to a position mark on the position carrier, the position of at least one other character in the character carrier is corresponding to at least one other position mark in the position carrier;

in response to a user's operation causing relative movement between the character carrier and the position carrier, aligning a particular character in the character carrier with a predetermined position mark in the position carrier; and in response to a lapse of a predetermined time after the particular character and the predetermined position mark is aligned, performing the following operations: recording the particular character and its input order; and changing the layout of the password inputting keyboard.

On the one hand, there is provided an apparatus for password entry, comprising:

a password inputting keyboard rendering module configured to display a password inputting keyboard on a display screen, the password inputting keyboard including a character carrier and a position carrier, wherein the character carrier is provided with a plurality of characters, the position carrier is provided with a plurality of position marks, the character carrier and the position carrier are capable of relative movement between each other so that when the position of a character in the character carrier is corresponding to a position mark on the position carrier, the position of at least one other character in the character carrier is corresponding to at least one other position mark in the position carrier;

a character-position alignment module configured to, in response to a user's operation causing relative movement between the character carrier and the position carrier, align a particular character in the character carrier with a predetermined position mark in the position carrier;

a password digit recording module configured to, in response to a lapse of a predetermined time after the particular character and the predetermined position mark is aligned, record the specific character and its input order; and a keyboard layout changing module configured to, in response to the lapse of a predetermined time after the particular character and the predetermined position mark is aligned, change the layout of the password inputting keyboard.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
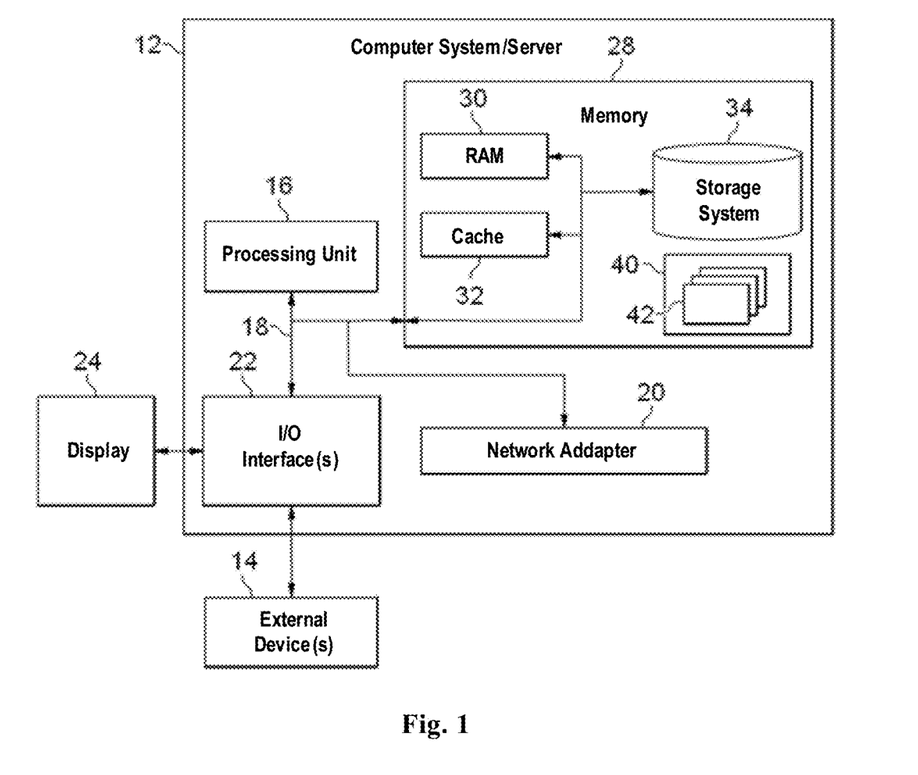
FIG. 1 shows an exemplary computer system/server 12 which is applicable to implement the embodiments of the invention.

Refer now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The computer system/server 12 shown in FIG. 1 and, in particular, those embodied as mobile smart devices equipped with touch screen are suitable for the implementation of embodiments of the invention.

Figure 2:
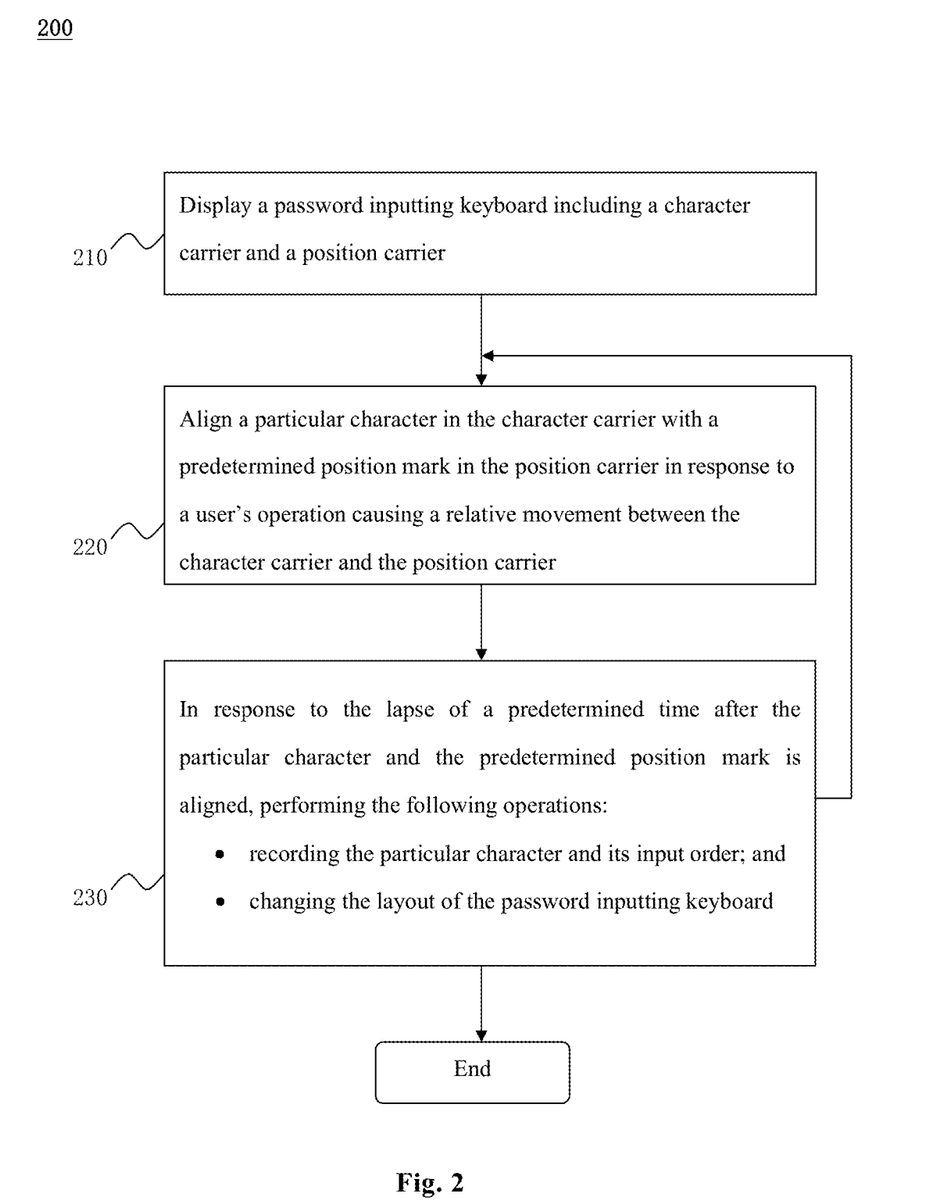
FIG. 2 schematically shows the flowchart of a method according to an embodiment of the invention.

Refer to FIG. 2, which schematically shows the flowchart of a method for password entry 200 according to an embodiment of the invention. The method as shown in the figure is suitable for implementation on computer terminals, and especially on mobile smart devices equipped with touch screen. The method comprises Steps 210, 220 and 230. Detailed description of each of the steps will be provided below with reference to other drawings.

Taking the touch screen of a mobile smart device as an example of display screen, the method 200 starts when a user of the mobile smart device needs to enter a password. First, Step 210 is executed.

In Step 210, a password inputting keyboard is displayed on the display screen, the password inputting keyboard including a character carrier and a position carrier, wherein the character carrier is provided with a plurality of characters, the position carrier is provided with a plurality of position marks, the character carrier and the position carrier are capable of relative movement between each other so that when the position of a character in the character carrier is corresponding to a position mark on the position carrier, the position of at least one other character in the character carrier is corresponding to at least one other position mark in the position carrier.

Figure 3A:
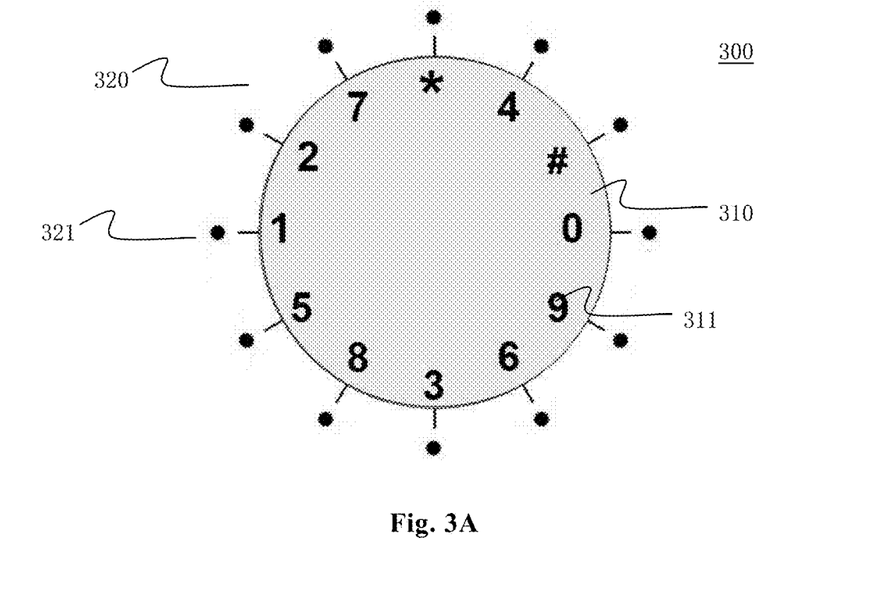
FIGS. 3A, 3B, 3C, 3D, and 3E schematically show soft keyboards for password entry according to embodiments of the invention.

FIG. 3A schematically shows a human-machine interface according to an embodiment of the invention, wherein a password inputting keyboard 300 displayed in Step 210 is depicted.

Password inputting keyboard 300 as depicted is a preferred embodiment of the invention. As shown in the figure, password inputting keyboard 300 includes two parts. One is a character carrier 310 and another is a position carrier 320. When a relative motion between character carrier 310 and position carrier 320 causes the position of a character in the character carrier to correspond to a position mark on the position carrier, the positions of the remaining characters in the character carrier are respectively in one-to-one correspondence with the remaining position marks in the position carrier.

Character carrier 310 as shown is shaped like a disc and contains a plurality of uniformly arranged characters 311. As an example, the plurality of characters 311 as shown are 12 characters "0", "1", . . . "9", "*" and "#".

It shall be noted that, in practical implementation of the invention, the character in character carrier 310 may be any symbol that can be used as password digit, such as letter, number and so on. More or fewer characters may be configured, and characters at different positions may be same or different.

Position carrier 320 is shaped like a concentric zone, the concentric zone (not shown) have the same circle center as disc 310, and is located in the outer peripheral of disc 310. Position carrier 320 contains a plurality of evenly distributed position marks 321. As an example, the plurality of position marks 321 are twelve dots at the one o'clock position, the two o'clock position, . . . , and the twelve o'clock position of a clock.

It shall be noted that the character carrier and the position carrier of the invention may be visibly shaped, such as character carrier 310, or invisibly shaped, such as position carrier 320. In addition, in practical implementation of the invention, the form of representation of position marks 321 is not limited to that shown in the drawing. With reference to other drawings, description of the form of representation of position marks 321, such as character and/or icon, will be given below.

Character carrier 310 and position carrier 320 can move relative between each other, so that when the position of a character 311 (such as "0") in the character carrier corresponds to a position mark 321 (for example at the three o'clock position) in the position carrier, positions of the rest of characters ("1", "2", . . . "9", "*" and "#") are respectively in one-to-one correspondence with the rest of position marks in the position carrier. For example, the character "1" corresponds to the position mark at the nine o'clock position, and the character "*" corresponds to the position mark at the twelve o'clock position.

Any display screen might be suitable for use with the invention, including touch screen, as long as the user can interact with the content rendered on the display screen through the pointer of an input device such as a mouse or through a finger operation.

According to an embodiment of the invention, the user may cause relative movement between character carrier 310 and position carrier 320 by moving character carrier 310. For example, the user can rotate disc 310 counterclockwise or clockwise to change the corresponding relation of the position of any character 311 in disc 310 with any position mark 321 in concentric zone 320, and when the position of a character (e.g., "0") corresponds to a position mark (e.g., at three o'clock position), positions of the rest characters ("1", "2", . . . "9", "*" and "#") are respectively in one-to-one correspondence with the rest position marks.

According to another embodiment of the invention, the user may also cause relative movement between character carrier 310 and position carrier 320 by moving position carrier 320. For example, the user can rotate concentric zone 320 counterclockwise or clockwise to change the corresponding relation of the position of any character 311 in disc 310 with any position mark 321 in concentric zone 320, and when the position of a character (e.g., "0") corresponds to a position mark (e.g., at the three o'clock position), positions of the rest of characters ("1", "2", . . . "9", "*" and "#") in disc 210 are respectively in one-to-one correspondence with the rest of position marks in concentric zone 320. As will be explained, position marks may be distinguishable by using characters or icons, and in this case, the correspondence relationship between the character and the position will become more obvious.

It shall be noted that, character carrier 310 and position carrier 320 are respectively represented by a disc and a belt-like concentric zone at the periphery of the disc in FIG. 3A. But the invention is not limited to that. For example, the concentric zone acting as position carrier 320 may be arranged inside the disc acting as character carrier 310.

Other forms of the password inputting keyboard will be illustrated in the following paragraphs with reference to FIGS. 5A-5D.

After the password inputting keyboard is displayed in Step 310, the user may enter individual password digits of a password by operating the character carrier and/or the position carrier.

In Step 220, a particular character in the character carrier is aligned with a predetermined position mark in the position carrier, in response to the user's operation causing relative movement between the character carrier and the position carrier.

Figure 3B:
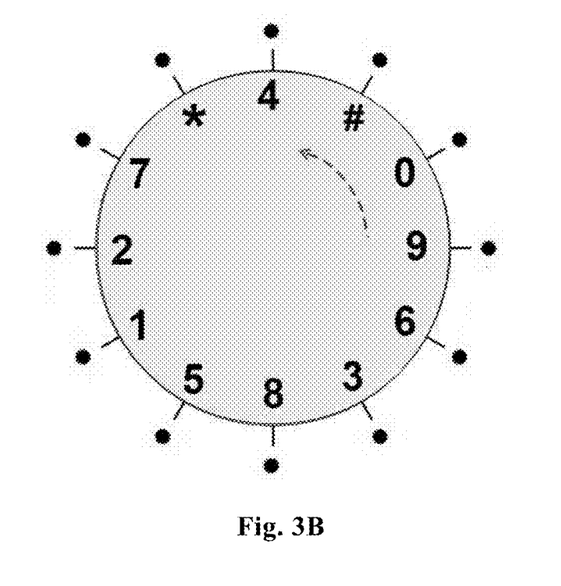

For example, assume that at the beginning, the current relative position between character carrier 310 and position carrier 320 is as shown in FIG. 3A and, according to the definition in advance, the predetermined position mark in position carrier 320 is the position mark at the twelve o'clock position. At this point, the user makes an operation that causes relative movement between character carrier 310 and position carrier 320, such as touching character carrier 310 with the finger to make character carrier 310 to rotate counterclockwise and stopping rotating when a particular character "4" in the character carrier is rotated to the twelve o'clock position in the position carrier. The response of the user interface to the operation is to align the character "4" in the character carrier with the position mark at the twelve o'clock position in the position carrier, as shown in FIG. 3B. At this point of time, the remaining characters in the character carrier and the remaining position marks in the position carrier are respectively in one-to-one alignment. For example, the character "8" is in alignment with the position mark at the six o'clock position in the position carrier, etc.

If the user does not want the character "4" to be the current password digit of the password to be entered, the user may continue to perform the operation causing relative movement between the character carrier and the position carrier after the character "4" is aligned with the position mark at the twelve o'clock position. However, if the user is determined to use the character "4" as the current password digit of the password to be entered, the user may suspend the operation causing relative movement between the character carrier and the position carrier after the character "4" is aligned with the position mark at the twelve o'clock position.

In Step 230, the following operations are performed in response to the lapse of a predetermined time after the particular character and the predetermined position mark is aligned:

recording the particular character and its input order; and changing the layout of the password inputting keyboard.

The predetermined time is a pre-defined period of time, for example, one second. The input order of the particular character indicates the order in which the particular character is entered as a password digit of the password.

If it exceeds a time period of one second after the character "4" in the character carrier is aligned with the position mark at the twelve o'clock position in the position carrier in Step 220, then, in Step 230, the character "4" and its input order will be recorded, for example, by storing a tuple {4,1} into the memory, to indicate that the character "4" is the first entered password digit.

In addition, if it exceeds a time period of one second after the character "4" in the character carrier is aligned with the position mark at the twelve o'clock position in the position carrier in Step 220, then, in Step 230, the layout of password inputting keyboard 300 will be changed.

The layout of the password inputting keyboard may be changed in different ways. According to an embodiment of the invention, said changing the layout of the password inputting keyboard comprises changing the relative position of the plurality of characters in the character carrier. For example, the relative position of the plurality of characters in the character carrier may be randomly changed, or the relative position of the plurality of characters in the character carrier may be changed according to predetermined rules.

Figure 3C:
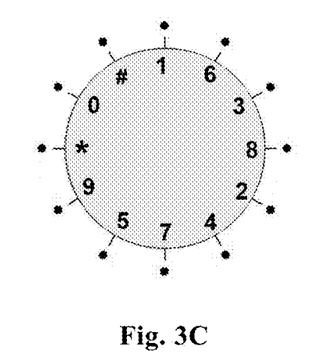

For example, in FIG. 3B, it is shown the current layout of the password inputting keyboard, wherein the relative position of the characters in the character carrier is {4-#-0-9-6-3-8-5-1-2-7-*}. According to the embodiment of the invention, the relative position of the characters may be randomly changed. For example, the current layout of the password inputting keyboard is changed to the layout of the password inputting keyboard as shown in FIG. 3C. In FIG. 3C, the relative position of the characters in the character carrier is changed to {4-7-5-9-*-0-#-1-6-3-8-2}.

According to another embodiment of the invention, said changing the layout of the password inputting keyboard comprises changing the relative position of the plurality of position marks in the position carrier.

Those skilled in the art shall appreciate that the manner of implementation of changing the relative position of the plurality of position marks in the position carrier is similar to the manner of implementation of changing the relative position of the plurality of characters in the character carrier. Thus detailed description is omitted here.

By a single execution of Steps 220 and 230, one password digit may be entered for the password. As denoted by the arrow from Step 230 to Step 220 (FIG. 2), Step 220 and Step 230 may be executed iteratively for a predetermined number of times, until the user has completed the input of the password.

The following example illustrates the process of inputting a full password. For the purpose of conciseness, it is assumed that a password is consisted of four characters (letter/number/symbol) according to a password setting rule. Suppose a user is to enter a password "4387", and, according to a pre-specified designation, the position mark at the twelve o'clock position is the predetermined position mark. The process of password inputting by the user is as follows.

In Step 210, a password inputting keyboard 300 as shown in FIG. 3A is displayed.

In Step 220, responsive to user's operation of rotating character carrier 310 counterclockwise, the character "4" is aligned with the position mark at the twelve o'clock position, as shown in FIG. 3B.

In step 230, responsive to the lapse of over one second after the character "4" in the character carrier is aligned with the position mark at the twelve o'clock position, the character "4" and its input order {4,1} will be recorded, and the layout of the password inputting keyboard shown in FIG. 3B will be changed to the layout of the password inputting keyboard as shown in FIG. 3C.

The password inputting keyboard as shown in FIG. 3C becomes the current password inputting keyboard present. By repeating the execution of Steps 220 and 230, the character "3" may be entered as the next password digit. The detailed process is as follows.

Figure 3D:
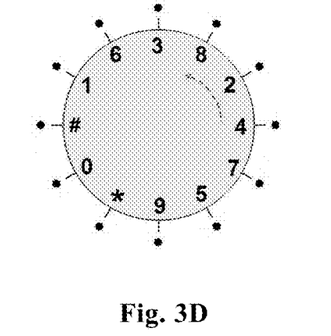

In Step 220, responsive to the user's operation of rotating character carrier 310 counterclockwise, the character "3" is aligned with the position mark at the twelve o'clock position, as shown in FIG. 3D.

Figure 3E:
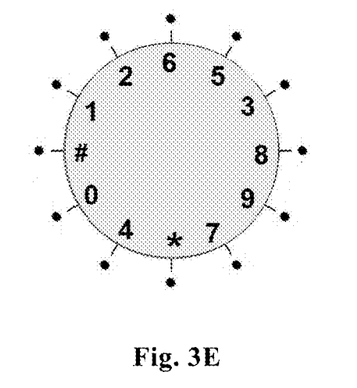

In step 230, in response to the lapse of over one second after the character "3" in the character carrier is aligned with the position mark at the twelve o'clock position, the character "3" and its input order {3,2} will be recorded, and the layout of the password inputting keyboard shown in FIG. 3D will be changed to the layout of the password inputting keyboard as shown in FIG. 3E.

By repeating the execution of Steps 220 and 230, the character "8" and "7" may additionally be entered as subsequent password digits. As a result, two tuples {8,3} and {7,4} are recorded. The specific process described above is similar to the process for the entry of password digits "4" and "3" as described above, and thus is omitted here.

After the characters "8" and "7" are entered, the user may click a "Complete" button (not shown) to indicate the completion of input. In this case, the process of password digit entry will be ended.

It shall be noted that Step 230 of changing the layout of the password inputting keyboard is helpful for preventing a bystander from deciphering the password through memorizing the character corresponding to a position mark while the user is inputting the password.

If the layout of the password inputting keyboard as shown in FIG. 3A were kept unchanged while the user is inputting a password, the bystander, who even has no idea of the predetermined position mark, may derive the possible combination of password digits through memorizing characters corresponding to a certain position mark, and decipher the password.

For example, while the user is inputting characters "4", "3", "8", "7" by rotating character carrier 310, the bystander does not know that the position mark at the twelve o'clock position is a predetermined position mark. However, the bystander might lock eyes with a position, such as the position mark at the six o'clock position mark.

If the user rotates character carrier 310 to align the character "4" with the position mark at the twelve o'clock position (FIG. 3B), the character "8" will be aligned with the position mark at the six o'clock position. The bystander may memorize the character "8" aligned with the position mark at the six o'clock position.

If the user rotates character carrier 310 to align the character "3" with the position mark at the twelve o'clock position (not shown), the character "*" will be aligned with the position mark at the six o'clock position. The bystander may memorize the character "*".

If the user rotates character carrier 310 to align the character "8" with the position mark at the twelve o'clock position (not shown), the character "4" will be aligned with the position mark at the six o'clock position. The bystander may memorize the character "4".

If the user rotates character carrier 310 to align the character "7" with the position mark at the twelve o'clock position (not shown), the character "6" will be aligned with the position mark at the six o'clock position. The bystander may memorize the character "6".

Therefore, the bystander may deduce that the combination of characters "8-*-4-6" is a possible combination of password digits. From the combination of characters, other possible combinations of password digits may be derived. For example, the combination of characters "5-4-#-3" aligned with the position mark at the five o'clock position, and the combination of characters "4-3-8-7" aligned with the position mark at the twelve o'clock position".

Thus, if the layout of the password inputting keyboard were kept unchanged, it would be easy for a bystander to decipher the combinations of password digits. By changing the password inputting keyboard layout, the invention can effectively lower the possibility of the password being deciphered by peepers.

Embodiments of entering the password digits "4", "3", "8", "7" have been described above, illustrating the process of inputting a password through entering one or more password digits on a touch screen.

According to an embodiment of the invention, the method for password entry further comprises a step of password construction, in which a password is constructed according to the recorded particular characters and their input order.

Continuing with the example above, as the user-entered particular characters and their input order {4,1}, {3,2}, {8,3} and {7,4} have been recorded in Step 230, the characters "4", "3", "8" and "7" may be assembled into a password "4387".

As mentioned in previous paragraphs, the user may enter a character as one password digit for a password through aligning the character in the character carrier with the predetermined position mark in the position carrier. According to an embodiment of the invention, the predetermined position mark is designated in advance. As for how to designate a position mark as the predetermined position mark, it is not the focus of the invention. Those skilled in the art shall appreciate that various ways of interaction commonly found in existing techniques may be employed to designate a position mark on the password inputting keyboard in advance to act as the predetermined position mark. Thus description of specific details is not needed herein.

According to an embodiment of the invention, the predetermined position mark may be one or more characters.

Figure 4A:
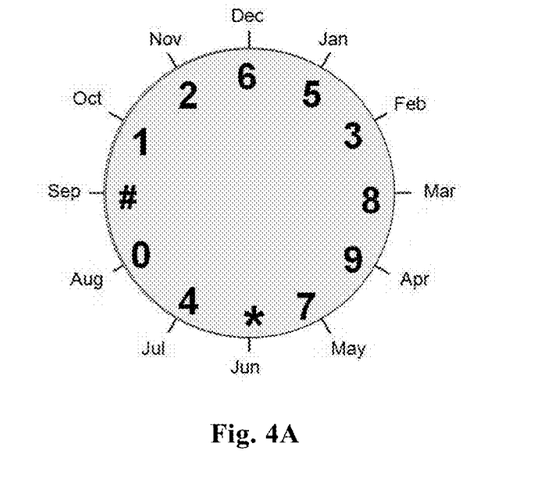
FIGS. 4A and 4B schematically show some formats of the password inputting keyboard according to embodiments of the invention.

Refer to FIG. 4A, which schematically shows the format of the password inputting keyboard according to another embodiment of the invention. The format of the password inputting keyboard depicted in FIG. 4A is basically the same as the format of the password inputting keyboard shown in FIG. 3A, with the only difference that the position marks of the password inputting keyboard in FIG. 4A are character strings. For example, the position mark at the twelve o'clock position in FIG. 3A is changed to the character string "Dec". FIG. 4A shows that the predetermined position marks mentioned in Steps 220 and 230 may be one or more characters.

In the event that the predetermined position mark is one or more characters, according to an embodiment of the invention, the step of password construction may further comprise using the predetermined position mark as a part of the password. For example, the character string "Dec" may be used as a part of the password, thus resulting in the password of "Dec4387".

Figure 4B:
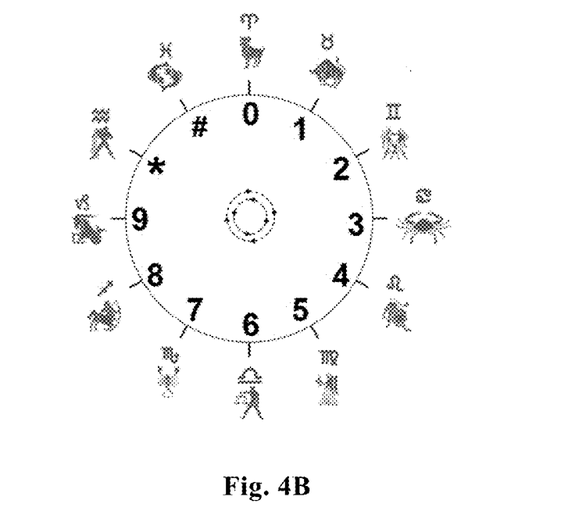

According to an embodiment of the invention, the predetermined position markers may be an icon. Refer to FIG. 4B, which schematically shows the format of the password inputting keyboard according to another embodiment of the invention. The format of the password inputting keyboard depicted in FIG. 4A is basically the same as the format of the password inputting keyboard shown in FIG. 3A, with the only difference that the position marks of the password inputting keyboard in FIG. 4B are icons. For example, the position mark at the twelve o'clock position in FIG. 3A is changed to the icon of lamb image. FIG. 4B shows that the predetermined position marks mentioned in Steps 220 and 230 may be an icon.

Due to their individualized and visualized characteristics, using icons as position marks has the advantages of being helpful for user's memory, contributing to diversified interfaces for password inputting and raising the degree of difficulty for others to guess the password.

In the event that an icon is used to act as the predetermined position mark, according to an embodiment of the invention, the icon may represent one or more characters and the step of password construction further comprises using the one or more characters representing the icon as part of the password.

For example, it may be pre-defined that the icon of a lamb image represents the character "L". Then in the step of password construction, the character "L" may be used as a part of the password, thus resulting in the password of "L4387".

As indicated in illustrating embodiments of the method of the invention with reference to FIG. 3A above, the password inputting keyboard of the invention is not limited to the form shown in FIG. 3A. Other forms of password inputting keyboard will be illustrated with reference to FIGS. 5A-5D in the following.

Figure 5A:
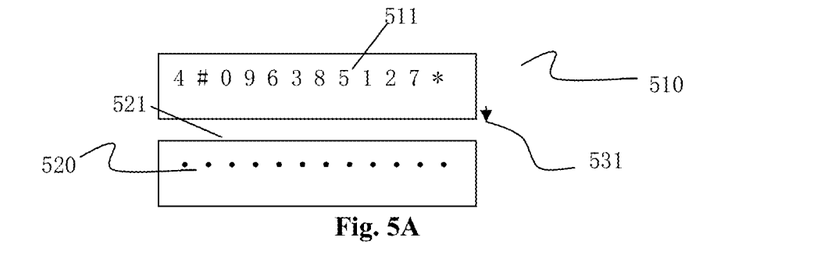
FIGS. 5A, 5B, 5C, and 5D schematically show additional formats of the password inputting keyboard according to embodiments of the invention.

Refer to FIG. 5A, which schematically shows the password inputting keyboard according to an embodiment of the invention. The password inputting keyboard as shown includes a character carrier 510 and a position carrier 520, wherein the character carrier contains a plurality of uniformly arranged characters 511, the position carrier contains a plurality of evenly distributed position marks 521, the character carrier and the position carrier are capable of relative movement between each other so that when the position of a character in the character carrier is corresponding to a position mark on the position carrier, positions of other characters in the character carrier are respectively in one-to-one correspondence with other position marks in the position carrier. Compared with FIG. 3A, character carrier 510 is shaped like a rectangular belt which may be imagined as if its head were linked with its end. Similarly, position carrier 520 is also shaped like a rectangular belt which may also be imagined as if its head were linked with its end.

The arrow 531 in FIG. 5A schematically denotes that the position mark at the rightmost side is a predetermined position mark. Since the predetermined position mark is designated in advance and known only to the user, in practical implementation, the arrow will not be shown in the password inputting keyboard.

Figure 5B:
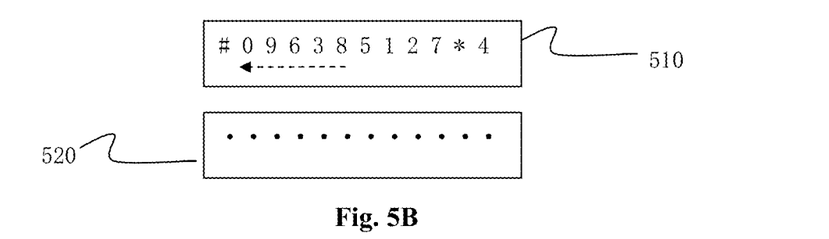

Refer to FIG. 5B, if character carrier 510 in FIG. 5A is moved to the left, the characters 511 in character carrier will also move to the left, wherein the character "4" moves from the leftmost side as shown in FIG. 5A to the rightmost side as shown in FIG. 5B.

Similarly, if character carrier 510 in FIG. 5A is moved to the right, the characters 511 in character carrier will also move to the right, wherein the character "*" moves from the rightmost side as shown in FIG. 5A to the leftmost side.

Figure 5C:
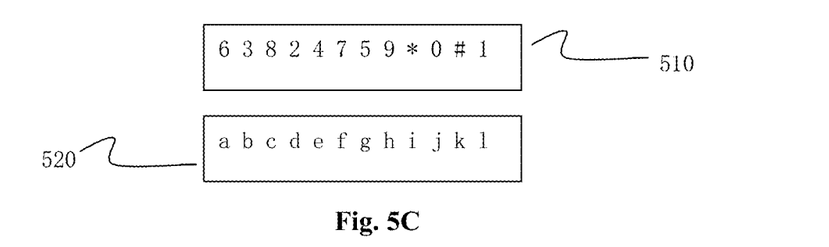

As already mentioned above, the predetermined position mark of the password inputting keyboard may be one or more characters. FIG. 5C schematically shows the password inputting keyboard according to an embodiment of invention. Compared with FIG. 5A, the position marks in position carrier 520 of the password inputting keyboard shown in FIG. 5C are changed, from dots at different positions, to a sequence of characters "a", "b", "c", "d", "e", "f", "g", "h", "i", "j", "k", "l".

Figure 5D:
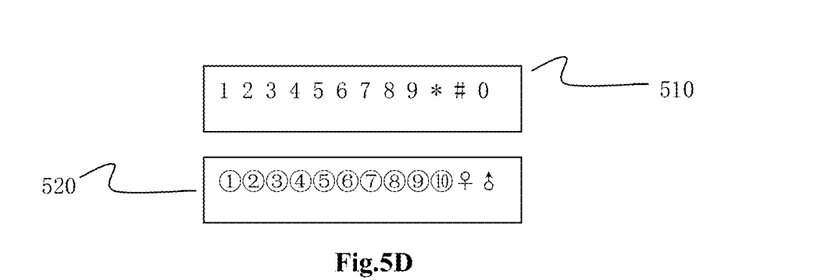

FIG. 5D schematically shows the password inputting keyboard according to an embodiment of invention. Compared with FIG. 5C, the main difference in FIG. 5D lies in the position marks on position carrier 520 in the password inputting keyboard shown in FIG. 5D, which are changed, from a sequence of characters, to a sequence of icons "①", "②", "③", "④", "⑤", "⑥", "⑦", "⑧", "⑨", "⑩", "♀" and "♂".

It has been described above, with reference to FIGS. 5A and 5B, the manner of moving character carrier 510 shown in FIG. 5A, as well as the manner of position change of the characters relative to the position marks on position carrier 520 while the character carrier is being moved.

Those skilled in the art shall appreciate that, if position carrier 520 in FIG. 5A is moved in a similar way, then the manner of the position change of the characters on character carrier 510 in FIG. 5A relative to the position marks on position carrier 520 will be similar. Also, if position carrier 520 in FIG. 5C is moved in a similar way, then the manner of the position change of the characters on character carrier 510 in FIG. 5C relative to the position marks on position carrier 520 will be similar. If position carrier 520 in FIG. 5D is moved in a similar way, then the manner of the position change of the characters on character carrier 510 in FIG. 5D relative to the position marks on position carrier 520 will be similar. Thus the description in detail is omitted here.

It shall be noted that character carrier 510 and position carrier 520 as depicted in FIGS. 5A-5D are visibly shaped. As pointed out in above paragraphs with reference to FIG. 3A, character carrier 510 and position carrier 520 in FIGS. 5A-5D may also be hidden or invisibly shaped. For example, only the characters "4", "#", "0", "9", "6", "3", "8", "5", "1", "2", "7", "*" contained in character carrier 510 are displayed, without having to show the box of the character carrier.

In the figures referred to in the description above, characters are evenly positioned on the character carrier of the password inputting keyboard and position marks are also uniformly arranged on the position carrier, and the character carrier and the position carrier are capable of relative movement between each other so that when the position of a character in the character carrier is corresponding to a position mark on the position carrier, positions of other characters in the character carrier are respectively in one-to-one correspondence with other position marks in the position carrier.

However, the invention is not limited to that. In practical implementations, characters need not to be evenly positioned on the character carrier of the password inputting keyboard and position marks also need not to be uniformly arranged on the position carrier. When the character carrier and the position carrier relatively move between each other so that the position of a character in the character carrier is corresponding to a position mark on the position carrier, positions of all other characters in the character carrier need not to be respectively in one-to-one correspondence with all other position marks in the position carrier. In other words, no matter how characters are arranged in the character carrier and how position marks are arranged in the position carrier, it would be okay if, when the character carrier and the position carrier are made to relatively move between each other so that the position of a character in the character carrier is corresponding to a position mark on the position carrier, positions of one or more other characters in the character carrier are respectively in correspondence with one or more other position marks in the position carrier.

Figure 6A:
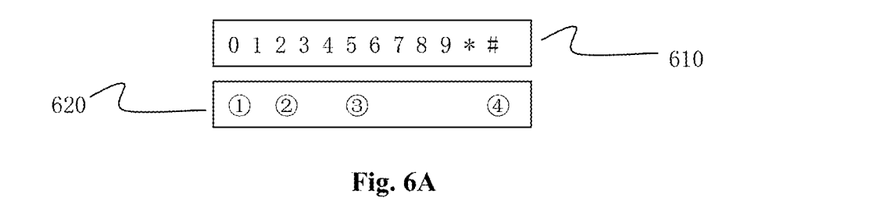
FIGS. 6A, 6B, and 6C schematically show additional formats of the password inputting keyboard according to embodiments of the invention.
Figure 6B:
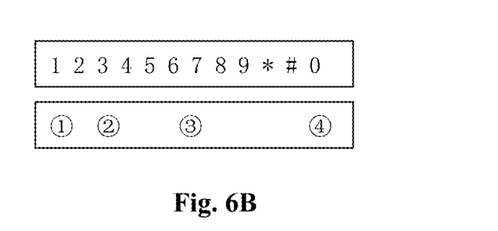
Figure 6C:
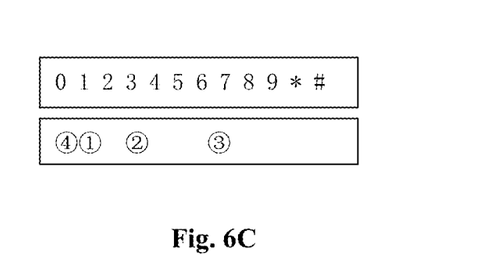

Refer to FIGS. 6A-6C, which schematically shows alternative forms of the password inputting keyboard according to an embodiment of the invention. The password inputting keyboard shown in FIG. 6A contains a character carrier 610 and a position carrier 620. Compared with FIG. 5D, the main difference lies in position carrier 620 in which there are arranged only four position marks, namely "①", "②", "③", and "④", and the four position marks are not uniformly spaced.

In the current layout of the password inputting keyboard shown in FIG. 6A, the character "0" is associated with the position mark "①", and the character "#" is associated with the position mark "④".

When character carrier 610 is moved to the left so that the position of the character "0" becomes corresponding to the position mark "④", there is correspondence between the character "1" and the position mark "①", as shown in FIG. 6B.

When position carrier 620 is moved to the right so that the position of the character "0" becomes corresponding to the position mark "④", there is correspondence between the character "1" and the position mark "①", as shown in FIG. 6C.

FIG. 6A-6C illustrate the situation that when the position of a character is corresponding to a position mark, the position of one other character in the character carrier is in correspondence with one other position mark. Based on the description in the specification, it would not be difficult for those skilled in the art to design a password inputting keyboard such that when the position of a character is corresponding to a position mark, positions of a plurality of other characters are respectively in one-to-one correspondence with a plurality of other position marks. Such a password inputting keyboard is also within the scope of the invention.

The various embodiments implementing the method of the invention have been described above with reference to the accompanying drawings. Those skilled in the art may understand that the method may be implemented in software, hardware or a combination of software and hardware. Moreover, those skilled in the art may understand by implementing various steps in the above method in software, hardware or a combination of software and hardware, there may be provided an apparatus for password entry based on the same invention concept. Even if the apparatus has the same hardware structure as a general-purpose processing device, the functionality of software contained therein makes the apparatus manifest distinguishing properties from the general-purpose processing device, thereby forming an apparatus of the various embodiments of the present invention.

Figure 7:
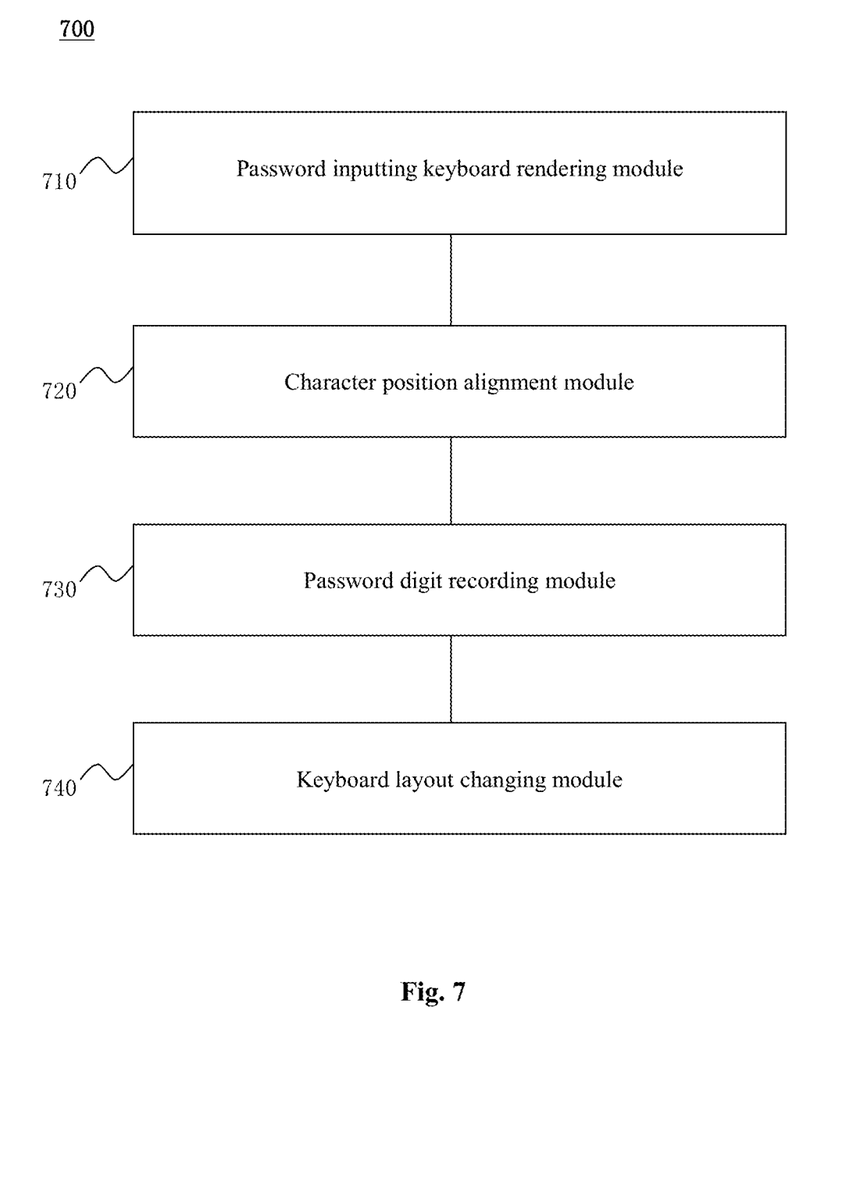
FIG. 7 schematically shows the block diagram of an apparatus according to an embodiment of the invention.

Based on the same inventive concept, the invention also provides an apparatus for password entry. FIG. 7 schematically shows the block diagram of an apparatus for password entry on a touch screen according to an embodiment of the invention.

The apparatus for password entry shown in FIG. 7 comprises a password inputting keyboard rendering module 710, a character-position alignment module 720, a password digit recording module 730 and a keyboard layout changing module 740.

The password inputting keyboard rendering module 710 is configured to display a password inputting keyboard on a display screen, the password inputting keyboard including a character carrier and a position carrier, wherein the character carrier is provided with a plurality of characters, the position carrier is provided with a plurality of position marks, the character carrier and the position carrier are capable of relative movement between each other so that when the position of a character in the character carrier is corresponding to a position mark on the position carrier, the position of at least one other character in the character carrier is corresponding to at least one other position mark in the position carrier.

The character-position alignment module 720 is configured to, in response to a user's operation causing relative movement between the character carrier and the position carrier, align a particular character in the character carrier with a predetermined position mark in the position carrier.

The password digit recording module 730 is configured to, in response to the lapse of a predetermined time after the particular character and the predetermined position mark is aligned, record the specific character and its input order.

The keyboard layout changing module 740 is configured to, in response to the lapse of a predetermined time after the particular character and the predetermined position mark is aligned, change the layout of the password inputting keyboard.

According to an embodiment of the invention, the password inputting keyboard rendering module 710 is further configured to cause the position of a character in the character carrier to correspond to a position mark in the position carrier while the positions of the remaining characters in the character carrier are respectively in one-to-one correspondence with the remaining position marks in the position carrier.

According to an embodiment of the invention, the keyboard layout changing module comprises a module configured to change the relative position of the plurality of characters in the character carrier.

According to an embodiment of the invention, the keyboard layout changing module comprises a module configured to change the relative position of the plurality of position marks in the position carrier.

According to an embodiment of the invention, the apparatus 700 further comprises a password assembly module configured to construct a password according to the recorded particular characters and their input order.

According to an embodiment of the invention, the predetermined position mark is designated in advance.

According to an embodiment of the invention, the predetermined position mark is one or more characters.

According to an embodiment of the invention, the password assembly module is further configured to use the predetermined position mark as part of the password.

According to an embodiment of the invention, the predetermined position mark is an icon.

According to an embodiment of the invention, the icon represents one or more characters, and the password assembly module is further configured to use the one or more characters representing the icon as part of the password.

Embodiments of the apparatus for password entry are described above. In the description of the embodiments of the apparatus for password entry, details that are repetitive or derivable from the description of various embodiments of the method for password entry are omitted.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, in some embodiments, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated data signal may take any of a variety of forms, including, but not limited to, an electromagnetic signal, optical signal, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instruction means which implements the function/act specified in the flowchart and/or block diagram block or blocks.

The computer program instructions may also be loaded onto a computer, other programmable data processing apparatus, or other devices to cause a series of operational steps to be performed on the computer, other programmable data processing apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for a password entry process, comprising steps of:
   (a) displaying a password inputting keyboard on a display screen, the password inputting keyboard including a character carrier and a position carrier, wherein the character carrier is provided with a plurality of characters, the position carrier is provided with a plurality of position marks, the character carrier and the position carrier are capable of relative movement between each other so that when a position of a character in the character carrier is corresponding to a position mark on the position carrier, the position of at least one other character in the character carrier is corresponding to at least one other position mark in the position carrier;
   (b) in response to a user's operation causing relative movement between the character carrier and the position carrier, aligning a particular character in the character carrier with a predetermined position mark in the position carrier; and
   (c) in response to exceeding a predetermined time after the particular character and the predetermined position mark is aligned prior to ending the password entry process, performing the following operations:
   (c-1) recording the particular character and its sequence number of input order; and
   (c-2) dynamically changing the layout of the password inputting keyboard and continuing the password character entry process.

2. The method according to claim 1, wherein when a relative movement between the character carrier and the position carrier causes the position of a character in the character carrier to correspond to a position mark in the position carrier, the positions of the remaining characters in the character carrier are respectively in one-to-one correspondence with the remaining position marks in the position carrier.

3. The method according to claim 1, wherein said changing the layout of the password inputting keyboard comprises:
   changing the relative position of the plurality of characters in the character carrier.

4. The method according to claim 1, wherein said changing the layout of the password inputting keyboard comprises:
   changing the relative position of the plurality of position marks in the position carrier.

5. The method according to claim 1, further comprising:
   repeatedly performing steps (b) and (c) for predetermined times.

6. The method according to claim 5, further comprising a step of password construction wherein a password is constructed according to the recorded particular characters and their input order.

7. The method according to claim 6, wherein the predetermined position mark is designated in advance.

8. The method according to claim 7, wherein the predetermined position mark is one or more characters.

9. The method according to claim 8, wherein the step of password construction further comprises:
   using the predetermined position mark as part of the password.

10. The method according to claim 7, wherein the predetermined position mark is an icon.

11. The method according to claim 10, wherein the icon represents one or more characters, and the step of password construction further comprises:
   using the one or more characters representing the icon as part of the password.

12. An apparatus for implementing a password entry process, comprising:
   a hardware data processor coupled to a storage device having program modules stored therein, wherein the program modules comprise:
   a password inputting keyboard rendering program module configured to display a password inputting keyboard on a display screen, the password inputting keyboard including a character carrier and a position carrier, wherein the character carrier is provided with a plurality of characters, the position carrier is provided with a plurality of position marks, the character carrier and the position carrier are capable of relative movement between each other so that when a position of a character in the character carrier is corresponding to a position mark on the position carrier, the position of at least one other character in the character carrier is corresponding to at least one other position mark in the position carrier;

a character-position alignment program module configured to, in response to a user's operation causing relative movement between the character carrier and the position carrier, align a particular character in the character carrier with a predetermined position mark in the position carrier;

a password digit recording program module configured to, in response to exceeding a predetermined time after the particular character and the predetermined position mark is aligned prior to ending the password entry process, record the specific character and its input order; and a keyboard layout changing program module configured to, in response to the exceeding of the predetermined time after the particular character and the predetermined position mark is aligned, record the particular character and its sequence number of input order and dynamically change the layout of the password inputting keyboard and continuing the password character entry process.

13. The apparatus according to claim 12, wherein the password inputting keyboard rendering program module is further configured to cause the position of a character in the character carrier to correspond to a position mark in the position carrier while the positions of the remaining characters in the character carrier are respectively in one-to-one correspondence with the remaining position marks in the position carrier.

14. The apparatus according to claim 12, wherein the keyboard layout changing program module comprises:

a program module configured to change the relative position of the plurality of characters in the character carrier.

15. The apparatus according to claim 12, wherein the keyboard layout changing program module comprises:

a program module configured to change the relative position of the plurality of position marks in the position carrier.

16. The apparatus according to claim 12, further comprising a password assembly program module configured to construct a password according to the recorded particular characters and their input order.

17. The apparatus according to claim 16, wherein the predetermined position mark is one or more characters.

18. The apparatus according to claim 17, wherein the password assembly program module is further configured to use the predetermined position mark as part of the password.

19. The apparatus according to claim 16, wherein the predetermined position mark is an icon.

20. The apparatus according to claim 19, wherein the icon represents one or more characters, and the password assembly program module is further configured to use the one or more characters representing the icon as part of the password.

21. A computer program product comprising one or more non-transitory computer readable storage medium(s) having computer readable program code embodied thereon, when executed to perform functions of password entry:

(a) displaying a password inputting keyboard on a display screen, the password inputting keyboard including a character carrier and a position carrier, wherein the character carrier is provided with a plurality of characters, the position carrier is provided with a plurality of position marks, the character carrier and the position carrier are capable of relative movement between each other so that when a position of a character in the character carrier is corresponding to a position mark on the position carrier, the position of at least one other character in the character carrier is corresponding to at least one other position mark in the position carrier;

(b) in response to a user's operation causing relative movement between the character carrier and the position carrier, aligning a particular character in the character carrier with a predetermined position mark in the position carrier; and (c) in response to exceeding a predetermined time after the particular character and the predetermined position mark is aligned prior to ending the password entry, performing the following operations:

(c-1) recording the particular character and its sequence number of input order; and (c-2) dynamically changing the layout of the password inputting keyboard and continuing the password character entry.

\* \* \* \* \*